United States Patent [19]
Hegler

[11] Patent Number: 5,693,347
[45] Date of Patent: Dec. 2, 1997

[54] APPARATUS FOR THE MANUFACTURE OF PIPES OF THERMOPLASTIC PLASTICS HAVING TRANSVERSE PROFILE FEATURES

[76] Inventor: Ralph-Peter Hegler, Schillerstrasse 7, D-97688 Bad Kissingen, Germany

[21] Appl. No.: 715,989

[22] Filed: Sep. 19, 1996

[30] Foreign Application Priority Data

Sep. 22, 1995 [DE] Germany ............... 195 35 231.9

[51] Int. Cl.[6] .............................................. B29C 33/36
[52] U.S. Cl. .................... 425/233; 264/209.4; 264/286; 264/508; 425/185; 425/326.1; 425/336; 425/395; 425/396
[58] Field of Search ..................... 425/185, 186, 425/233, 336, 337, 326.1, 327, 395, 396; 264/508, 209.4, 286, 209.5, 531, 532, 564

[56] References Cited

U.S. PATENT DOCUMENTS

| 4,212,618 | 7/1980 | Hegler et al. | 425/326.1 |
|---|---|---|---|
| 4,325,685 | 4/1982 | Lupke et al. | 425/183 |
| 4,365,948 | 12/1982 | Chaplain | 425/336 |
| 4,492,551 | 1/1985 | Hegler et al. | 425/326.1 |
| 4,787,598 | 11/1988 | Rahn et al. | 425/396 |
| 4,900,503 | 2/1990 | Hegler et al. | 264/508 |
| 5,320,797 | 6/1994 | Hegler et al. | 264/511 |
| 5,372,774 | 12/1994 | Lupke | 425/326.1 |
| 5,510,071 | 4/1996 | Van Wonderen et al. | 425/326.1 |
| 5,522,718 | 6/1996 | Dietrich | 264/508 |
| 5,560,941 | 10/1996 | Hegler et al. | 425/396 |

FOREIGN PATENT DOCUMENTS

| 9311140.1 | 9/1993 | Germany. |
|---|---|---|
| 4318514 | 8/1994 | Germany. |
| 94/07673 | 4/1994 | WIPO. |

*Primary Examiner*—Jay H. Woo
*Assistant Examiner*—Joseph Leyson
*Attorney, Agent, or Firm*—Laff, Whitesel, Conte & Saret, Ltd.

[57] ABSTRACT

An apparatus for the manufacture of pipes of thermoplastic plastics having transverse profile features comprises mold segment halves guided by twos to circulate on a molding path. A conveying device is provided for the recirculation of the mold segment halves, working in the way of a gantry crane. On a conveying bridge overlapping the molding path, two conveying carriages are provided, which are displaceable in directions opposite to each other and at right angles to the direction of production and to each of which is attached a conveying arm directed downwards and having a holding device for a mold segment half.

15 Claims, 4 Drawing Sheets

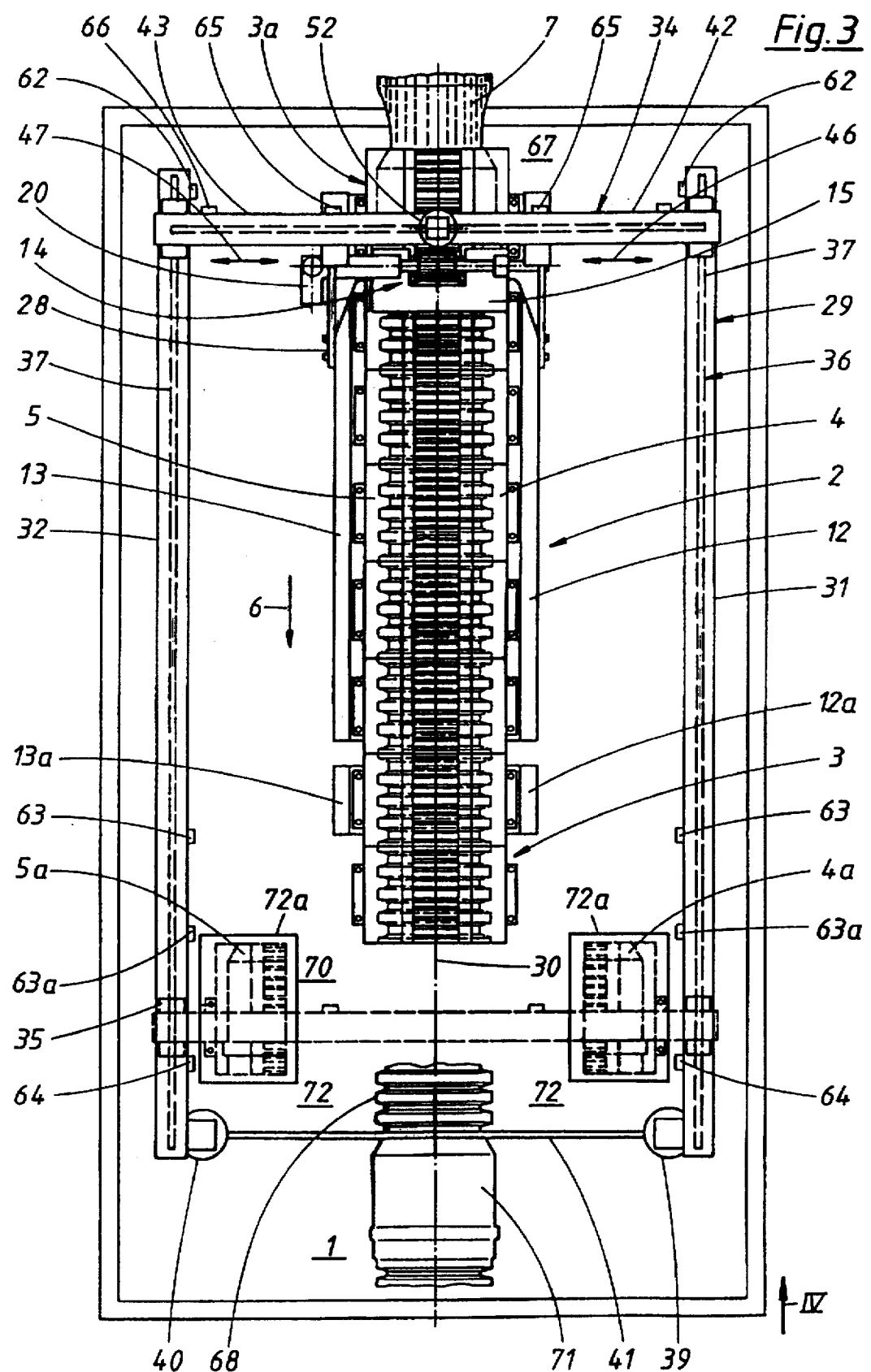

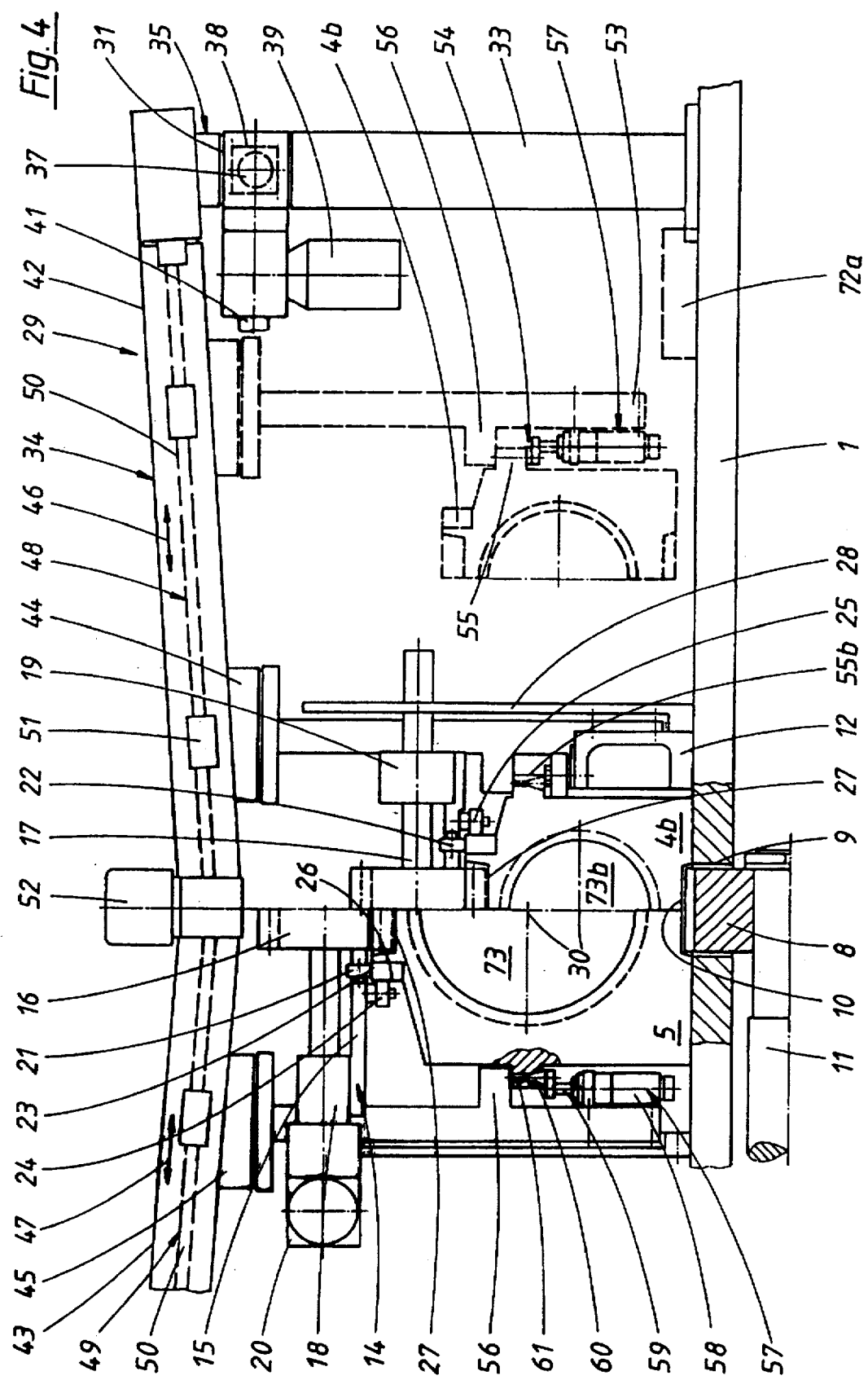

APPARATUS FOR THE MANUFACTURE OF PIPES OF THERMOPLASTIC PLASTICS HAVING TRANSVERSE PROFILE FEATURES

BACKGROUND OF THE INVENTION

1. Field of the Invention

The invention relates to an apparatus for the manufacture of pipes of thermoplastic plastics having transverse profile features with mold segment halves guided to circulate and disposed subsequent to an injection head in two lines opposite to each other, the mold segment halves complementing one another by twos along a straight molding path to form a closed hollow mold, each of the mold segment halves of a line that are not interconnected being guided out of the molding path at the downstream end of the latter and substantially at right angles to the direction of production by means of a conveying device and being recirculated to the upstream end of the molding path, where they are again added to the molding path and put to the respective mold segment half that leads in the direction of production.

2. Background Art

An apparatus of the generic type known from U.S. Pat. No. 4,212,618 ensures that as low as possible a number of circulating mold segment halves is needed. The mold segment halves are separated from each other on the return path and returned at such an average speed that the return period for each mold segment half is less than the time needed by a half to move on the molding path by a distance corresponding to its length. This results in the saving of more than fifty percent of the mold segment halves as compared to conventional apparatuses of continuously circulating mold segment halves. There is but one mold segment half on each return path, which is piloted back to the upstream end of the molding path by continuous, accelerated and again decelerated motion. Owing to the low number of mold segment halves needed, the apparatus can be retrofitted for another diameter of pipe rapidly and at little expense, which is important in particular for pipes of extreme diameters, taking into account that in general only comparatively small quantities of such pipes are produced, there being little sense in preparing an entire apparatus for the manufacture of this pipe diameter. Such an apparatus will also provide for saving in the manufacture of special types of pipes as well as in the manufacture of transition pieces, sockets etc, these special types too only requiring a very limited number of the expensive mold segment halves.

DE 43 18 514 C1 likewise teaches an apparatus of the generic type, in which the conveying device is formed by carriages, which are disposed on both sides of the molding path and displaceable parallel to the direction of production and on which grapplers are supported which are displaceable at right anlges to the direction of production by means of drives. The carriages are displaceable on guides extending parallel to the molding path. The grapplers are displaceable in guides of the carriages exclusively at right angles to the latter's paths of motion. This is supposed to render attainable a simple and stable structure of the grapplers and easy control of the latter. The lateral arrangement of the carriages and the comparatively wide bearing-out of the grapplers from the latter when the mold segment halves coupled with them are in the vicinity of the molding path, lead to comparatively distinctive moments or forces acting on the carriage.

U.S. Pat. No. 4,325,685 discloses an apparatus for the production of corrugated pipes of thermoplastic plastics having transverse profile features, in which individual mold segment halves revolve continuously on two closed paths, two mold segment halves joining on a molding path to form a mold segment, and mold segments lying close by close to form a mold, in which a thermally plastic tube discharged by the injection head of an extruder or an injection-molding machine is molded to form a corrugated pipe. The individual mold segment halves have several different profiles, of which one at a time can be put into function. To this end, the mold segment halves are disposed on supports for displacement at right angles to their direction of movement and are moved into their working position by a shunt system. In this way even such mold segment halves can be engaged that mold a socket and/or a spigot of a pipe.

An apparatus for the manufacture of corrugated pipes of thermoplastic plastics is known from DE-G 93 11 140 U1, in which the mold segment halves, contiguous by twos, are conveyed on a molding path by a driving pinion, which engages with a tooth profile on the lower side of the mold segment halves. The conveyance back is likewise effected by pinions, which are drivable to move sidewise, the mold segment halves thus being movable from the molding path to a return path and from the return path back again to the molding path. Subsequent to the pinions of sidewise conveyance, the return paths are provided with parking stations for mold segment halves that can be inserted in the return paths by their own drives. If a pair of mold segment halves, for instance for the molding of sockets and/or spigots on the pipe to be produced, is to be added to the molding path, then the corresponding additional mold segments halves are inserted in the return path and moved to the upstream end of the molding path, where they are added to the molding path. Simultaneously, a pair of mold segment halves, after being conveyed sidewise, is removed from the molding path at the downstream end of the molding path and prior to entering the return path, is moved into the parking position. If the additional mold segment halves are to be removed from the circuit, then the parked mold segment half is inserted in the respective return path directly prior to these additional mold segment halves being conveyed sidewise away from the molding path, so that the additional mold segment half can be parked again. As a result, the molding path has always the same length; only such additional mold segment halves can be inserted that have exactly the length of the usual mold segment halves for the production of the corrugated pipe.

SUMMARY OF THE INVENTION

It is the object of the invention to embody an apparatus of the generic type, the structure of which is even more simplified and stable.

According to the invention, this object is solved by the conveying device being in the form of a gantry crane, which comprises a conveying bridge displaceable in the direction of production and overlapping the molding path, two conveying carriages disposed on the conveying bridge and displaceable in opposite directions one relative to the other and at right angles to the direction of production, and, on each conveying carriage, a conveying arm directed downwards towards the base and having a holding device for a mold segment half. By embodying the conveying device in the way of a gantry crane with the conveying carriages and the conveying arms associated in accordance with the invention, the entire system becomes substantially free from torque, i.e. there are no tilting forces to be compensated by corresponding constractional measures. Retrofitting for the purpose of manufacturing pipes having different transverse profile features or different diameters is very easily feasible.

3

Another advantage to be accentuated of the embodiment according to the invention resides in that the conveying bridge has two bridge sections, which run towards each other, inclining to the molding path; this helps attain that fundamentally, the mold segment halves only stand on and are moved on the base while they are on the molding path. The entire return conveyance of the mold segment halves takes place in a condition in which they are lifted off the base. This helps create the possibility of higher conveying speeds and reduces the wear considerably. Moreover, there is a reduction in the input of energy for the operation of the conveying device which substantially serves to recirculate the mold segment halves.

Further features, advantages and details of the invention will become apparent from the ensuing description of an example of embodiment, taken in conjunction with the drawing.

BRIEF DESCRIPTION OF THE DRAWING

FIG. 3 is a plan view of an apparatus for the manufacture of pipes with sockets, and FIG. 4 is a front view of the apparatus along the arrow IV of FIG. 3.

DESCRIPTION OF THE PREFERRED EMBODIMENT

Figure 1:
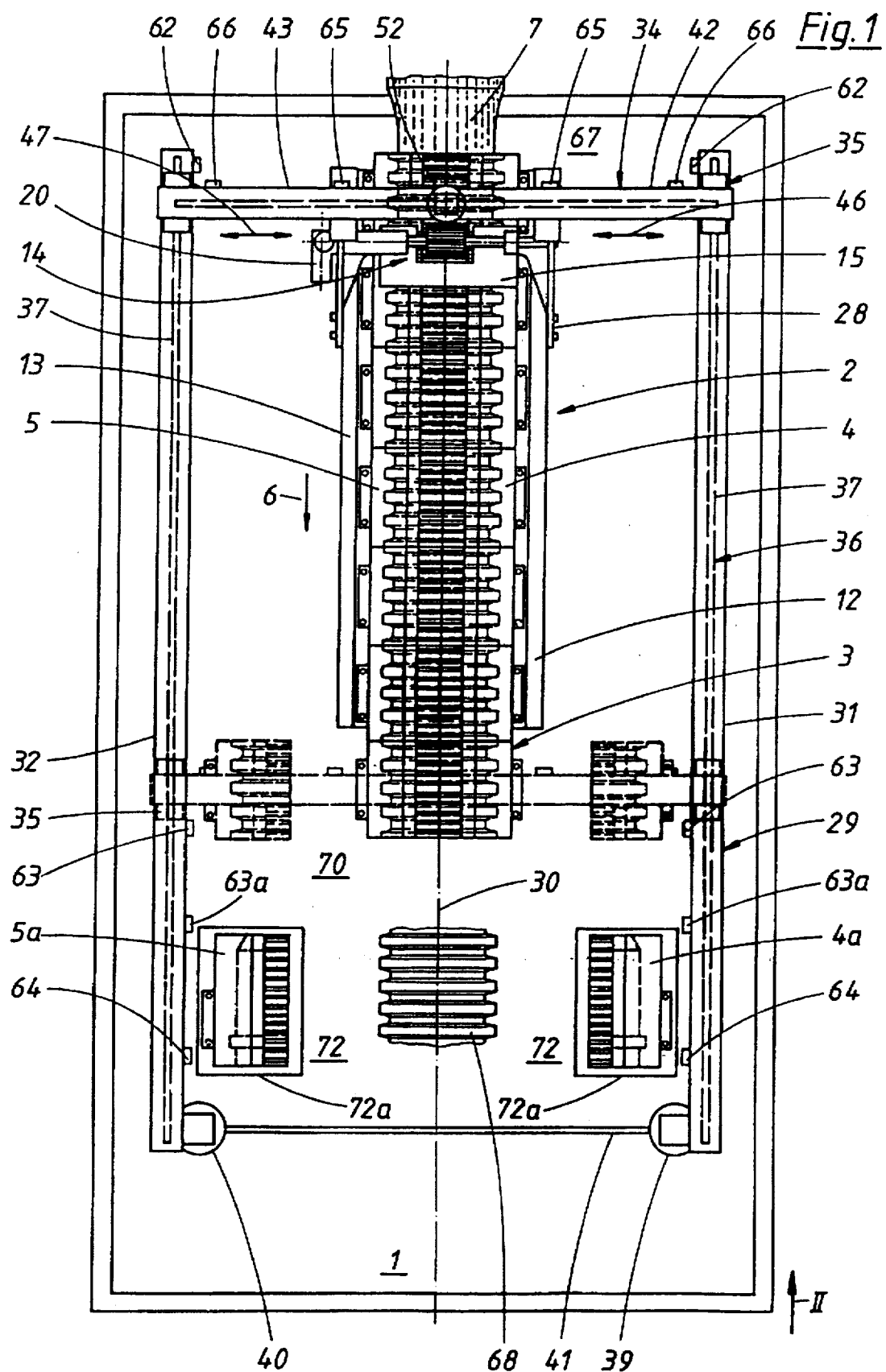
FIG. 1 is a plan view of an apparatus for the manufacture of pipes.
Figure 2:
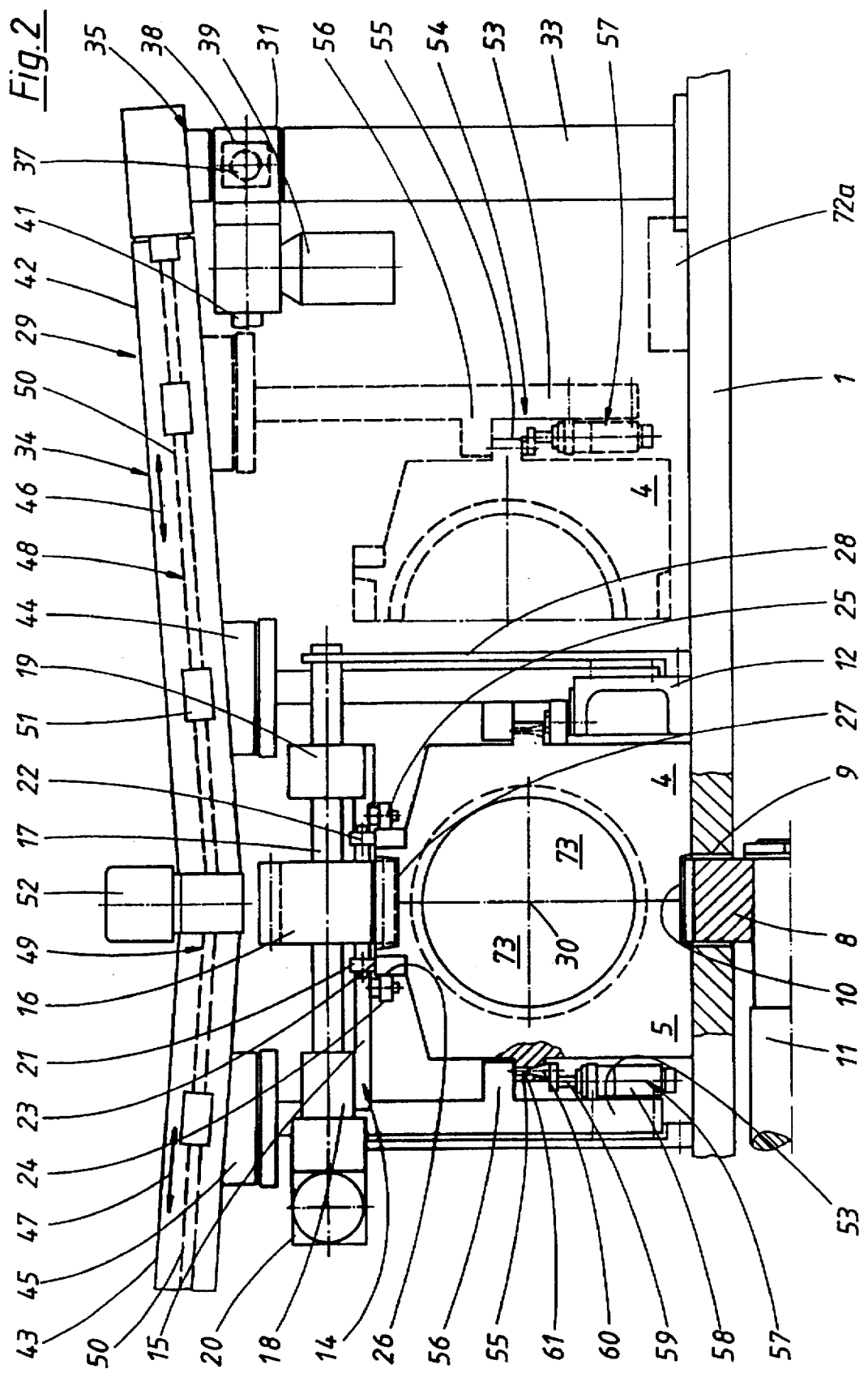
FIG. 2 is a front view of the apparatus along the arrow II of FIG. 1.

FIGS. 1 and 2 illustrate an apparatus for the manufacture of pipes of thermoplastic plastics having transverse profile features. This apparatus has a base 1 with a molding path 2 situated on it. On this molding path 2, mold segments 3 are lined up, each consisting of two mold segment halves 4, 5. As long as the mold segment halves 4, 5 are joined together by twos, forming a mold segment 3, and as long as adjacent mold segments 3 are joined together, forming a mold, they move in a straight line corresponding to a direction of production 6 on the base 1. For the continuous drive of the mold formed by the mold segments 3, a lower driving pinion 8 is provided right behind an injection head 7 of an extruder, the pinion 8 passing through a recess 9 in the base 1 and engaging with a tooth profile 10 formed on the respective lower side of the mold segment halves 4, 5. The lower driving pinion 8 is non-rotatably mounted on a drive shaft 11 which is located underneath the base 1 and driven by a gear motor (not shown). The mold segment halves 4, 5 are guided and kept together on the molding path 2 by guide rails 12, 13 which engage with such portion of the mold segment halves 4, 5 that is adjacent to the base 1.

A thrust bearing 14 is provided above the base and above the mold. It has a a base plate 15 on which is supported an upper driving pinion 16. This upper driving pinion 16 is likewise non-rotatably mounted on a drive shaft 17, both ends of which are run in bearings 18, 19 which are fastened to the base plate 15. The drive shaft 17 is driven by a gear motor 20 which is attached to the adjacent bearing 18. Supporting rollers 21 are located on the lower side of the base plate 15, having a horizontal axis of rotation 22 and supporting themselves on supporting faces 23 formed on the upper side of each mold segment half 4, 5, which defines the position of the thrust bearing 14 relative to the mold segment halves 4. Guide rollers 24 are positioned on the lower side of the base plate 15, having a vertical axis of rotation 25 and engaging laterally with guide faces 26, which are also formed on the upper side of the mold segment halves 4, 5. By means of these guide rollers 24, the upper portion of two mold segment halves 4, 5 forming a mold segment 3 is guided and held together. Between the supporting faces 23 and the guide faces 26, respectively, the upper driving pinion 16 engages with a tooth profile 27, which is formed on the upper side of the mold segment halves 4, 5. Only one third to one quarter of the amount of advance exercised on the mold segments 3 by the lower driving pinion 8 is transmitted to the mold segments 3 by the upper driving pinion 16. The thrust bearing 14 is supported in torque converter bearings 28, which are mounted on the base 1 and stand vertically upright on the latter and which intercept the torque exercised by the gear motor 20 on the thrust bearing 14. The thrust bearing 14 itself rests on the supporting faces 23 substantially by its deadweight. This deadweight is sufficient to compensate the forces occuring where the upper driving pinion 16 engages with the tooth profile 27 and acting vertically upwards on the thrust bearing 14.

A conveying device 29 for the mold segment halves 4, 5 is provided above the base plate 1. This conveying device 29 is designed in the way of a gantry crane. It has two guide rails 31, 32 extending parallel to each other and parallel to the direction of conveyance 6, to the central longitudinal axis 30 of the mold segments 3 and to the base 1. These guide rails 31, 32 are disposed above the thrust bearing 14 and supported relative to the base 1 by props 33. A conveying bridge 34 is supported on the guide rails 31, 32 by bogie wagons 35. Displacement of the conveying bridge 34 on the guide rails 31, 32 takes place by means of linear drives 36, which are spindle drives in the concrete embodiment. Consequently, these linear drives 36 have threaded spindles 37, on which are disposed threaded nuts 38, which are again fixed to the bogie wagons 35. The threaded spindles 37 are driven each by a gear motor 39, 40, these two gear motors 39, 40 being forcibly synchronized by way of a horizontal coupling shaft 41 extending at right angles to the guide rails 31, 32. These two drive spindles 37 are driven precisely at the same speed so that the conveying bridge 34 is displaced free from tilting on the guide rails 31, 32. The conveying bridge 34 has two bridge sections 42, 43, which, seen from the guide rails 31, 32, run towards each other, inclining to the base 1. Consequently, the lowest distance of the bridge 34 from the base 1 is in the middle of the bridge 34 vertically above the central longitudinal axis 30. A conveying carriage 44, 45 is displaceably disposed on each of the two bridge sections 42, 43 and is movable in the respective direction of displacement 46 or 47 by means of a linear drive 48 or 49. These linear drives 48, 49 substantially consist of a threaded spindle 50 housed in the respective bridge section 42 or 43 and engaging with a threaded nut 51 on the respective conveying carriage 44 or 45. The two threaded spindles 50 are driven by a common gear motor 52. The gear motors 39, 40 and the gear motor 52 are reversible motors, i.e. they are suitable for forward and backward travel.

A conveying arm 53, which extends vertically downwards, is attached to each conveying carriage 44, 45. Each conveying arm 53 is provided with a holding device 54 for a mold segment half 4 and 5, respectively. Allocated to the holding device 54, a holding abutment 55 is formed on each mold segment half 4 and 5, respectively. Each holding device 54 has an upper supporting structure 56, against which a holding abutment 55 is pressed from below. Further, a clamping device 57, which substantially consists of a pneumatic or hydraulic piston-cylinder drive 58, belongs to the holding device 54. A locking pin 60 is formed on the piston rod 59 of this drive 58, which, upon corresponding actuation of the drive 58, engages with a locking recess 61 on the lower side of the holding abutment 55, simultaneously pressing the abutment 55 against the supporting structure 56. In the position shown on the left of FIG. 2, the holding device 54 and the holding abutment 55 of the adjacent mold segment half 4 or 5 are interlocked; consequently, the latter is tightly united with the conveying arm 53.

Proximity switches 62 63, 63a, 64 are disposed on the guide rails 31, 32, which upon approach of the conveying bridge 34, emit signals reflecting the latter's position to a central control unit (not shown). Proximity switches 65, 66 are also disposed on the conveying bridge 34, which emit signals reflecting an inner or outer position of the respective conveying carriage 44, 45 to the central control unit.

Operation is as follows:

Two tubes of thermally plastic plastics are extruded from the injection head 7 of the extruder, entering the mold at the upstream end 67 of the molding path 2, where they are transformed by means of overpressure or vacuum and, if necessary, support air into a composite pipe 68 which has a smooth inside wall and an outer corrugation 69 as known in detail from U.S. Pat. No. 5,320,797, to which reference is made. Instead of a composite pipe 68, it is possible, from a single tube of thermally plastic plastics, to produce a gilled pipe as known from U.S. Pat. No. 4,492,551 or a finned pipe as known from U.S. Pat. No. 4,900,503.

The mold consisting of the mold segments 3 advances in the direction of production 6. The pipe 68 produced in it travels along with it at the same speed. When a mold segment 3 has reached the downstream end 70 of the molding path 2, the two mold segment halves 4, 5 forming this mold segment 3 must be removed from the molding path 2 at right angles to the direction of production 6. As shown by dot-dashed lines in FIGS. 1 and 2—this is done by the transverse conveying means formed by the conveying carriages 44, 45 with conveying arms 53. During the last short distance covered by the last mold segment 3 in the direction of production 6, the conveying bridge 34 is run along with the latter at the same speed, the two conveying carriages 44, 45 being moved into their position adjoining each other. In this position, the holding devices 54 and the holding abutments 55 of the two mold segment halves 4, 5 have been interlocked. When reaching the downstream end 70, the two conveying carriages 44, 45 are moved apart because of a corresponding signal of the proximity switches 63, to which end the gear motor 52 is correspondingly triggered. Owing to the inclination of the two bridge sections 42, 43, the mold segment halves 4, 5 held by the conveying arms 53 are lifted off the base and moved outwards frictionlessly. When the conveying carriages 44 reach the external proximity switches 66, they are stopped. The gear motors 39, 40 are triggered so that the conveying bridge 34 is moved counter to the direction of production 6 as far as to the upstream end 67 of the molding path 2. Also during their transport counter to the direction of production 6, the mold segment halves 4, 5 do not contact the base 1, but are frictionless above the latter. They are always moved parallel to themselves.

When the upstream proximity switches 62 are reached, the gear motors 39, 40 are stopped so that the conveying bridge 34 is at a standstill. The gear motor 52 is switched on, moving the conveying carriages 44, 45 inwards towards the molding path and, at the upstream end 67, guiding the two mold segment halves 4, 5 at right angles to the direction of production 6 into the molding path 2, as shown by solid lines in FIGS. 1 and 2. During the displacement of the conveying carriages 44, 45 towards the molding path 2, owing to the inclination of the bridge sections 42, 43, the mold segment halves 4, 5 are again lowered towards the base 1, on which they rest when the two mold segment halves 4, 5 of a mold segment 3 contact, as seen in FIG. 2. Then the conveying bridge 34 is moved in the direction of production 6 until the two mold segment halves 4, 5 that already form a mold segment 3 bear against the mold segment halves 4, 5 leading in the direction of production 6 and are seized and moved on by the driving pinions 8 and 16. Then the clamping devices 57 are released and the conveying arms 53 are again moved outwards away from the molding path. The conveying bridge 34 is then again displaced as far as to the downstream end 70, as described above.

On the apparatus so far described for the manufacture of pipes 68, mold segment halves 4a, 5a can be employed additionally for forming an additional mold segment 3a, for instance if sockets 71 are to be formed at regular distances in the pipe 68 to be manufactured continuously, as known from U.S. Pat. No. 5,320,797. The additonal mold segment halves 4a, 5a are situated—referred to the direction of production 6—downstream of the downstream end 70 of the molding path 2 in a parking position 72 on the base 1. The conveying bridge 34 can be moved into this parking position 72. This parking position 72 is formed by a pedestal 72a on the base 1, the height of which on the base 1 results from the inclination of the bridge sections 42, 43. The pedestal 72a is sufficiently high for the respective mold segment half 4a or 5a to sit on this pedestal 72a in the associated position of the conveying arms 53 that bear it. The proximity switches 64 on the guide rails 31, 32 are allocated to this parking position 72. When the additional mold segment halves 4a, 5a are to be used, then the conveying bridge 34 is moved as far as into the parking position 72, and the additional mold segment halves 4a, 5a and the conveying arms 53 of the conveying carriages 44, 45 are interlocked, as shown by dashed lines in FIG. 3. Then conveying counter to the direction of production 6 takes place in the manner described until the two additional mold segment halves 4a, 5a are led into the molding path 2 at the upstream end 67, as seen in FIG. 3. If, in this case, the molding path 2 is prolonged, as seen in FIG. 3 as compared to FIG. 1, then it can be useful to provide additional guide rails 12a, 13a, which, for instance in the case of non-use of the mold segment halves 4a, 5a, can be arranged to be countersunk in the base 1. In this case, proximity switches 63a that are displaced downstream in the direction of production 6 are used instead of the proximity switches 63, taking the function of the proximity switches 63. Of course, the additional mold segment halves 4a, 5a need not be integrated into the circulation of the mold segment halves 4, 5; after each passage through the molding path 2, they can be moved into their parking position 72 to be employed again at a later time. This depends exclusively on how long are to be the molding path 2 and the pipe sections to which a socket 71 is to be allocated.

FIG. 4 illustrates that pipes 68 of varying diameters can be produced on the apparatus. In FIG. 2 and on the left of FIG. 4, mold segment halves 4, 5 are shown, having mold recesses 73 for pipes 68 of a great diameter. On the right of FIG. 4, a mold segment half 4b is shown by dashed lines, having a mold recess 73b for pipes of a smaller diameter. The holding abutments 55b are disposed on the mold segments halves 4b in such a way that the mold segment halves 4b and of course also the associated mold segments halves (not shown) stand on the base 1. In the case of a change-over of the apparatus to pipes of a different diameter, the inner proximity switches 65 must change place correspondingly.

What is claimed is:

1. An apparatus for the manufacture of pipes of thermoplastic plastics having transverse profile features, comprising:
   a base plate (1);
   a straight molding path (2) on said base plate (1);
   a plurality of mold segment halves (4, 5), of which each is provided with a mold recess (73) and of which two at a time combine as a pair on said molding path (2) on said base plate (1) to form a closed mold with a mold space and of which each are separate from each other;
   means for pushing said mold segment halves (4, 5) on said molding path (2) in a direction of production (6) from an upstream end (67) to a downstream end (70) of said molding path (2), which means include a pinion being provided at said upstream end (67) and drivable by a motor and engaging said mold segment halves (4, 5);
   guide rails (12, 13) for guiding and keeping together said mold segment halves (4, 5) on said molding path (2);
   an injection head (7) of an extruder being arranged upstream of said molding path (2);
   a conveying device (29) for guiding out of the molding path (2) said mold segment halves (4, 5) at the downstream end (70) of the molding path (2) at right angles to the direction of production (6) and for recirculating said mold segment halves (4, 5) to said upstream end (67) of the molding path (2) and for re-guiding said mold segment halves (4, 5) to the molding path (2) to form said closed mold,
   said conveying device (29) being in the form of a gantry crane, which comprises one conveying bridge (34) displaceable in the direction of production (6) and overlapping the molding path (2),
   two conveying carriages (44, 45) disposed on the conveying bridge (34) and displaceable in opposite directions one relative to the other and at right angles to the direction of production (6), and,
   on each conveying carriage (44, 45), a conveying arm (53) directed downwards towards the base (1) and having a holding device (54) for a mold segment half (4, 5), each said holding device (54) having a clamping device (57) being capable to be locked with a mold segment half (4, 5) at said downstream end (70) and to be released at said upstream end (67).

2. An apparatus according to claim 1, wherein the conveying bridge (34) has two bridge sections (42, 43), which run towards each other, inclining to the molding path (2), each of said two conveying carriages (44, 45) being disposed on a respective one of said two bridge sections (42, 43).

3. An apparatus according to claim 1, wherein, downstream of the downstream end (70) and on both sides of the molding path (2), at least one parking position (72) is provided for an additional mold segment half (4a, 5a), and said conveying device (29) is further capable of conveying the additional mold segment halves (4a, 5a) to and from the parking positions (72) and of conveying the additional mold segment halves (4a, 5a) as the plurality of mold segment halves (4, 5).

4. An apparatus according to claim 3, wherein the parking position (72) is raised in relation to the base (1).

5. An apparatus according to claim 1, wherein the conveying bridge (34) is supported on guide rails (31, 32) extending parallel to the molding path (2).

6. An apparatus according to claim 5, wherein the guide rails (31, 32) are disposed above the base (1).

7. An apparatus according to claim 1, wherein the conveying bridge (34) is displaceable by means of two linear drives (36), which are coupled with each other to work in the same direction.

8. An apparatus according to claim 1, wherein the conveying carriages (44, 45) are displaceable by means of two linear drives (48, 49), which are coupled with each other to work in opposite directions.

9. An apparatus for the manufacture of pipes of thermoplastic plastics having transverse profile features, comprising:
   a base (1);
   a straight molding path (2) on said base (1);
   a plurality of mold segment halves (4, 5), of which each is provided with a mold recess (73) and of which two at a time combine as a pair on said molding path (2) to form a closed mold with a mold space and of which each are separate from each other;
   means for pushing said mold segment halves (4, 5) on said molding path (2) in a direction of production (6) from an upstream end (57) to a downstream end (70) of said molding path (2);
   an injection head (7) of an extruder being arranged upstream of said molding path (2);
   a conveying device (29) for guiding out of the molding path (2) said mold segment halves (4, 5) at the downstream end (70) of the molding path (2) at right angles to the direction of production (6) and for recirculating said mold segment halves (4, 5) to said upstream end (67) of the molding path (2) and for re-guiding said mold segment halves (4, 5) to the molding path (2) to form said closed mold,
   said conveying device (29) being in the form of a gantry crane, which comprises a conveying bridge (34) displaceable in the direction of production (6) and overlapping the molding path (2),
   two conveying carriages (44, 45) disposed on the conveying bridge (34) and displaceable in opposite directions one relative to the other and at right angles to the direction of production (6), and,
   on each conveying carriage (44, 45), a conveying arm (53) directed downwards towards the base (1) and having a holding device (54) for a mold segment half (4, 5), wherein the conveying bridge (34) has two bridge sections (42, 43), which run towards each other, inclining to the molding path (2), each of said two conveying carriages (44, 45) being disposed on a respective one of said two bridge sections (42, 43).

10. An apparatus according to claim 9, wherein, downstream of the downstream end (70) and on both sides of the molding path (2), at least one parking position (72) is provided for an additional mold segment half (4a, 5a), and said conveying device (29) is further capable of conveying the additional mold segment halves (4a, 5a) to and from the parking positions (72) and of conveying the additional mold segment halves (4a, 5a) as the plurality of mold segment halves (4, 5).

11. An apparatus according to claim 10, wherein the parking position (72) is raised in relation to the base (1).

12. An apparatus according to claim 9, wherein the conveying bridge (34) is supported on guide rails (31, 32) extending parallel to the molding path (2).

13. An apparatus according to claim 12, wherein the guide rails (31, 32) are disposed above the base (1).

14. An apparatus according to claim 9, wherein the conveying bridge (34) is displaceable by means of two linear drives (36), which are coupled with each other to work in the same direction.

15. An apparatus according to claim 9, wherein the conveying carriages (44, 45), are displacable by means of two linear drives (48, 49), which are coupled with each other to work in opposite directions.

* * * * *